UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

WATERPROOF OBJECT OR ARTICLE.

1,160,363. Specification of Letters Patent. Patented Nov. 16, 1915.

No Drawing. Application filed November 30, 1910. Serial No. 594,978.

*To all whom it may concern:*

Be it known that I, LEO H. BAEKELAND, a citizen of the United States, residing at Yonkers, in the county of Westchester and State of New York, have invented certain new and useful Improvements in Waterproof Objects or Articles, of which the following is a specification.

The object of this invention is the provision of durable and waterproof articles or objects consisting essentially of a hydrated cementitious base or body, and a filling, coating or envelop of an infusible condensation product of phenols and formaldehyde. The coating penetrates the pores or interstices of the base to an extent which depends upon the method employed to produce the article, and becomes firmly interlocked with the base in such manner and to such degree that it strongly resists checking, flaking or detachment, even though subject to shrinking stresses which are necessarily set up during the operations whereby the condensation product is rendered infusible. The superficial coating when properly prepared is not only infusible and capable of withstanding temperatures in excess of 300° C., without deterioration, but is also resistant to all solvents and to the action of steam, water and most chemical reagents.

Such cementitious compositions as plaster of Paris, mixtures of magnesia with asbestos or other fibers, Portland and other cements, most artificial stone compositions, etc., take up water during setting, and by reason of their hydration are not adapted to receive the usual silicate glaze or enamel which is applied to brick, terra cotta, pottery and the like, the high temperatures required for application of such enamels being injurious or destructive to the hydrated cementitious compositions. According to the present invention I am enabled to apply to a base or body of hydrated cementitious material an organic enamel which is comparable with the silicate enamel in its resistance to atmospheric and other agencies. The enamel is rendered infusible by application of heat, but the temperatures employed are such that injury to the cementitious body or base is avoided.

For the preparation of such objects or articles I may proceed as follows: A liquid reaction product of phenols and formaldehyde is first prepared by known methods, for example by heating a mixture of phenol or its homologues and formaldehyde or its polymers, either alone or in presence of catalytic or condensing agents. Suitable proportions are approximately equal volumes of commercial phenol or cresol and commercial formaldehyde. These bodies yield by reaction a product consisting of two liquids which will separate or stratify on standing. The supernatant liquid is an aqueous solution which contains the water resulting from the reaction or added with the reagents, whereas the heavier liquid is oily or viscous in character and contains the initial products of chemical condensation. The liquids are readily separated, and the aqueous solution may be rejected, or the water may be eliminated by evaporation. The oily or viscous liquid obtained as above described is soluble in or miscible with alcohol, acetone, phenol, and some other solvents. This product may assume a pasty or semi-solid state when cooled, or may even assume a solid or brittle state, but is again liquefied when heated, and this alternate solidification and liquefaction may be repeated so long as the product does not become transformed into an intermediate or final condensation product.

The cementitious material to be treated, which may consist of cement or a cement composition, plaster of Paris, artificial stone, or the like, is dipped in or otherwise coated with the liquid reaction produced above described, or with a varnish prepared by dissolving in alcohol or other appropriate solvent one of the initial condensation products of phenols and formaldehyde. The coated article is then submitted to a gradual rise of temperature until the surface layer is transformed into a final condition of maximum insolubility and infusibility. The transformation may be facilitated and accelerated by the use of appropriate condensing or catalytic agents, as acids, bases or salts. This process may be repeated one or more times to obtain coatings of any desired thickness. Or instead of submitting the coated object to a gradual rise of temperature, it may be heated to a temperature of 160° to 200° C., under suitable pressure, as for example 80 pounds per square inch, of air or a neutral gas in a closed vessel, whereby the hardening is quickly performed without liability of blistering or rendering the coating porous. The temperature should of course be regulated with reference to the character of the hydrated cementitious body, to avoid dehydration thereof.

The coated objects present the appearance of hard glazed pottery ware, and are capable of withstanding indefinitely the severest climatic conditions, thus rendering them suitable for many technical purposes, as for example roofing tiles, signs, ornaments and fancy articles, for which such soft, pervious and perishable cementitious materials as plaster of Paris or the like are totally unfit. The coated objects possess moreover excellent insulating properties, for which reason they are adapted to a wide variety of uses in the electrical arts.

The appearance of the coating may be varied as desired by the addition of pigments or by the use of dyes.

For certain purposes it is desirable that the articles should be impregnated throughout or to a greater or less depth with the infusible condensation product, and in such cases impregnation may be assisted by known means, as for example by the use of vacuum and pressure. Or the article may be impregnated with a suitable mixture of formaldehyde and carbolic acid or their equivalents, the chemical reaction being favored by the use of suitable catalytic or condensing agents, as for example bases, acids or salts, with or without the use of heat and pressure. Plaster of Paris, compositions of magnesia and asbestos fiber, and similar hydrated cementitious compositions, when thus impregnated with the infusible condensation product, are found to possess excellent electrical insulating properties.

The invention possesses particular advantages in its application to cementitious bodies containing basic-reacting components, as for example Portland or similar cements. I have heretofore pointed out (see "The Synthesis, Constitution, and Uses of Bakelite," *Journal of Industrial and Engineering Chemistry*, vol. 1, No. 3, 1909; U. S. Patent No. 942,809, December 7, 1909, etc.), the remarkable effects resulting from the presence of small proportions of bases in the preparation of infusible condensation products of the type herein contemplated; and it is to be presumed that the highly resistant character of the phenolic condensation product constituting the protecting film as well as its perfect union with the cementitious body, are attributable in part to the interaction between the composition and the basic-reacting components of these cementitious materials. It is also believed that the basic-reacting components of the cement are effective in bringing about the transformation of the phenolic condensation product to the infusible state rapidly and at the low temperature described, whereby the enamel-like coating is produced without weakening or dehydrating the cementitious body. A further advantage in the use of these phenolic condensation products as coatings for cementitious bodies in general arises from the fact that the dissolved or liquid condensation product is not repelled by the cement, but can be applied with satisfactory results even to surfaces which are not completely dry, in strong contrast to all oil varnishes, as well as to all resinous or like varnishes which undergo hydrolysis in presence of moisture.

I claim:

1. An article of manufacture, comprising a body of hydrated cementitious material, and a surface coating therefor, said surface coating containing as an essential component an organic substance which is infusible at the temperature at which the cementitious material undergoes dehydration, and is resistant to known solvents.

2. An article of manufacture, comprising a body of hydrated cementitious material, and a surface coating therefor, said surface coating containing as an essential component an organic substance which is infusible at the temperature at which the cementitious material undergoes dehydration, and is resistant to known solvents, said body or base likewise impregnated with said organic substance.

3. An article of manufacture, comprising a body of hydrated cementitious material, and a surface coating therefor, said surface coating containing as an essential component a phenolic condensation product which is infusible at the temperature at which the cementitious material undergoes dehydration, and is resistant to known solvents.

4. An article of manufacture, comprising a body of hydrated cementitious material, and a surface coating therefor, said surface coating containing as an essential component a phenolic condensation product which is infusible at the temperature at which the cementitious material undergoes dehydration, and is resistant to known solvents, said body or base likewise impregnated with said condensation product.

5. An article of manufacture, comprising a body of hydrated cementitious material having a basic-reacting component, and a surface coating therefor, said surface coating containing as an essential component an infusible and insoluble phenolic condensation product.

6. An article of manufacture, comprising a body or base of Portland cement, and a surface coating therefor, said surface coating containing as an essential component an insoluble and infusible phenolic condensation product.

In testimony whereof, I affix my signature in presence of two witnesses.

LEO H. BAEKELAND.

Witnesses:
HERBERT S. NAY,
WM. S. GORDON, Jr.